United States Patent
Bugenhagen (10) Patent No.: US 10,135,829 B2
(45) Date of Patent: *Nov. 20, 2018

(54) SYSTEM AND METHOD FOR SECURE MACHINE-TO-MACHINE COMMUNICATIONS

(71) Applicant: CenturyLink Intellectual Property LLC, Denver, CO (US)

(72) Inventor: Michael K. Bugenhagen, Leawood, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/713,026

(22) Filed: Sep. 22, 2017

(65) Prior Publication Data

US 2018/0013762 A1 Jan. 11, 2018

Related U.S. Application Data

(63) Continuation of application No. 15/385,630, filed on Dec. 20, 2016, now Pat. No. 9,800,583, which is a
(Continued)

(51) Int. Cl.
*H04L 29/06* (2006.01)
*H04W 4/70* (2018.01)
(Continued)

(52) U.S. Cl.
CPC .......... *H04L 63/10* (2013.01); *H04L 61/1511* (2013.01); *H04L 61/1552* (2013.01);
(Continued)

(58) Field of Classification Search
CPC ....... H04L 63/10; H04L 63/101; H04L 63/20; H04L 63/0281; H04L 61/1511; H04L 61/1552; H04L 67/12
See application file for complete search history.

(56) References Cited

U.S. PATENT DOCUMENTS 9,077,687 B2 7/2015 Bugenhagen
9,560,051 B2 1/2017 Bugenhagen
(Continued)

OTHER PUBLICATIONS

U.S. Appl. No. 13/723,627; Non-Final Rejection dated Jul. 29, 2014; 20 pages.
(Continued)

*Primary Examiner* — Eleni A Shiferaw
*Assistant Examiner* — Hee K Song
(74) *Attorney, Agent, or Firm* — Adsero IP (57) ABSTRACT

Embodiments of the present invention include a method for providing a secure domain name system (DNS) for machine to machine communications. In one embodiment, the method includes storing policy information for machine to machine communications in a global DNS registry database server. The method further includes communicating the policy information for machine to machine communications from the global DNS registry database server to a machine DNS registry server located in an Internet service provider (ISP) network, wherein a control signaling gateway located in the ISP network is configured to utilize the policy information for machine to machine communications to allow only registered controllers associated with a machine to communicate with the machine.

18 Claims, 4 Drawing Sheets

Related U.S. Application Data continuation of application No. 14/728,155, filed on Jun. 2, 2015, now Pat. No. 9,560,051, which is a continuation of application No. 13/723,627, filed on Dec. 21, 2012, now Pat. No. 9,077,687.

(60) Provisional application No. 61/645,467, filed on May 10, 2012.

(51) Int. Cl.
*H04L 29/12* (2006.01)
*H04L 29/08* (2006.01)

(52) U.S. Cl.
CPC ........ *H04L 63/0281* (2013.01); *H04L 63/101* (2013.01); *H04L 63/20* (2013.01); *H04L 67/10* (2013.01); *H04L 67/12* (2013.01); *H04W 4/70* (2018.02)

(56) References Cited

U.S. PATENT DOCUMENTS

| | | | |
|---|---|---|---|
| 9,800,583 | B2 | 10/2017 | Bugenhagen |
| 2005/0259654 | A1 | 11/2005 | Faulk, Jr. |
| 2010/0131646 | A1 | 5/2010 | Drako |
| 2011/0200052 | A1 | 8/2011 | Mungo et al. |
| 2012/0017259 | A1 | 1/2012 | MacCarthaigh |
| 2012/0036241 | A1 | 2/2012 | Jennings et al. |
| 2012/0084831 | A1 | 4/2012 | Hu et al. |
| 2012/0278626 | A1 | 11/2012 | Smith et al. |
| 2012/0311693 | A1 | 12/2012 | Horman et al. |
| 2013/0024556 | A1* | 1/2013 | Zhu ........................ H04L 41/042 709/223 |
| 2013/0041997 | A1* | 2/2013 | Li .......................... H04W 4/005 709/223 |
| 2013/0094444 | A1 | 4/2013 | Lai et al. |
| 2013/0305345 | A1 | 11/2013 | Bugenhagen |
| 2014/0143833 | A1 | 5/2014 | Rajan et al. |
| 2015/0281242 | A1 | 10/2015 | Bugenhagen |
| 2017/0104757 | A1 | 4/2017 | Bugenhagen |

OTHER PUBLICATIONS

U.S. Appl. No. 13/723,627; Final Rejection dated Jan. 5, 2015; 15 pages.
U.S. Appl. No. 13/723,627; Notice of Allowance dated Mar. 2, 2015; 19 pages.
U.S. Appl. No. 13/723,627; Issue Notification dated Jun. 17, 2015; 1 page.
U.S. Appl. No. 14/728,155; Non-Final Rejection dated Jun. 10, 2016; 26 pages.
U.S. Appl. No. 14/728,155; Notice of Allowance dated Sep. 28, 2016; 21 pages.
U.S. Appl. No. 14/728,155; Issue Notification dated Jan. 11, 2017; 1 page.
U.S. Appl. No. 15/385,630; Non-Final Rejection dated Feb. 17, 2017; 22 pages.
U.S. Appl. No. 15/385,630; Notice of Allowance dated Jun. 22, 2017; 23 pages.

* cited by examiner

SYSTEM AND METHOD FOR SECURE MACHINE-TO-MACHINE COMMUNICATIONS

CROSS REFERENCE TO RELATED APPLICATIONS

This application is a continuation application of U.S. patent application Ser. No. 15/385,630 filed Dec. 20, 2016, by Michael K. Bugenhagen and titled, "System and Method for Secure Machine-To-Machine Communications," which is a continuation application of U.S. patent application Ser. No. 14/728,155 (now U.S. Pat. No. 9,560,051), filed Jun. 2, 2015, by Michael K. Bugenhagen and titled, "System and Method for Secure Machine-To-Machine Communications," which is a continuation application of U.S. patent application Ser. No. 13/723,627 (now U.S. Pat. No. 9,077,687), filed Dec. 21, 2012, by Michael K. Bugenhagen and titled, "System and Method for Secure Machine-To-Machine Communications," which claims priority to U.S. Provisional Patent Application Ser. No. 61/645,467, filed May 10, 2012 entitled DNS ACS MIB ENHANCEMENTS FOR M2M REGISTRATION, AND TESTING OF ACCESS, the entire teachings of which are incorporated herein.

BACKGROUND OF THE INVENTION

Field of the Invention

The principles of the present invention relate generally to an improved communications system, and in particular, to an improved system for machine to machine communications.

Description of the Related Art

In the last decade, telecommunications have moved from legacy plain old telephone service (POTS) to (Internet-protocol) IP based network systems. As a result, alarm systems and other "machines" deployed in the home have migrated to using IP communications instead of using POTS for communication with a centralized control system. In the next decade, power resource issues and governmental policies are driving network systems to "power down" unused communication gear that is currently kept powered on 24×7.

Additionally, most devices on the Internet currently communicate using Internet protocol version 4 (IPv4). IPv4 provides approximately 4.29 billion addresses. However, with the number of devices on the Internet rapidly growing, IPv4 address exhaustion is a real concern. Thus, certain service providers may share IP addresses among machines via rotating active IP addresses in order to share them across the customer base. This dynamic address rotation, coupled with powering down idle communication devices makes it nearly impossible machine to machine like controllers to track the current IP address and state of connectivity for any user.

The result of the above events is that communication systems that power down paths may not have the state-full knowledge of the end device and will have no way to mitigate the "lack of communication path" as there is no standard for different organizations to exchange path and routing information in a secure manner.

Thus, the disclosed embodiments seek to provide one or more solutions to one or more of the above problems associated with machine to machine communications.

BRIEF SUMMARY OF THE INVENTION

As telecom and Internet Service Providers (ISPs) introduce new policy changes to the system, the disclosed embodiments recognize that a shift to a controlled secure network would be advantageous for machine to machine communications. Examples of machine to machine communications include, but not limited to, a sensor in a dam that notifies another machine in response to the water level exceeding a certain threshold, machines to monitor patients, machines inside cars, and home automation. Aspects of the disclosed embodiments include identifying the functional components to enable a dynamically flexible hybrid authentication and routing system for improving machine to machine communications. To enable this type of architecture, the disclosed embodiments include a Central Domain Name Service (DNS) registry with centralized control. DNS is a function within the set of standards for how computers exchange data on the Internet and on many private networks, known as the TCP/IP protocol suite. A DNS server or name server manages a massive database that maps domain names to IP addresses for enabling users to communicate with a network device using their domain name instead of having to remember and type in an IP address. For example, the disclosed embodiments enable a monitoring device to request communications to a patient's heart monitoring machine using a universal resource locators (URL) (e.g., joesheartmonitor@southwestmethodisthospital.org) as opposed to using an IP address or other machine identifier. Contrary to current practices, the disclosed embodiments change the current DNS structure to a controlled and contained secure DNS network with additional fields to facilitate access authorization. This modified Secure DNS architecture is firewalled off (north bound side) from Internet traffic to prevent access to the secure authoritative DNS, and removes the risk of poisoning attacks, which occur when a rouge network computer sends DNS responses to a computer or end unit with a false IP address that "poisons" the DNS address on that machine in order to hijack and reroute communications on that machine. The disclosed embodiments prevent DNS poisoning by securely transmitting to a customer's machine or computer only after the machine is registered with a DNS authorization controller. As referenced herein, a controller is a device or machine that has permission to talk to another machine via authentication & then address resolution. The controller may read and/or write data to the machine and/or cause the machine to perform an action.

A key issue in machine to machine is enabling authorized user applications/devices the ability to find the remote machine due to problems caused by ISPs rotating IP address and because authorized user devices might be mobile in which case their address is changing as well. To this end, a global authorization and address resolution system is required to ensure secure and available communications for the overall system. The disclosed embodiments provide new relationships, functions, and information exchange in order to facilitate those complex functions.

The disclosed embodiments include an enhanced and private (or virtually private) DNS like authorization and location server network that enables remote machines to register themselves, and be locatable by "authorized" agents. In one embodiment, a separate secure DNS like protocol stack is run on clients in order to facilitate their registration with the secure DNS system. The secure DNS system contains relational information for each "owning" secure DNS domain. Each domain controls all the addresses under it, along with a relational profile of clients and what rights they have to access remote machines. Each secure DNS may locally contain information, or provide it to a global DNS to facilitate distribution of the information.

As will be described in detail, embodiments of the present invention include an apparatus, system, method, and computer program product for enhancing machine-to-machine communications. For example, the disclosed embodiments include a machine to machine secure domain name system (DNS) registry server network. In one embodiment, the system includes a machine DNS registry server located in an Internet service provider (ISP) network. The system also includes a global or home DNS registry database server that includes policies for machine to machine communications for registered clients of that machine to machine controller group. The global DNS registry database server is configured to accept updates from organizational machine to machine servers that push the policies for machine to machine communications to the machine DNS registry server located in the ISP network over a secure connection. The system further includes a control signaling gateway located in the ISP network and in communication with the machine DNS registry server located in the ISP network. The control signaling gateway is configured to utilize the policies for machine to machine communications to allow only registered controllers associated with a machine to communicate with the machine.

In another embodiment, a method, implemented on a machine having at least one processor, storage, and a communication platform for providing a secure domain name system for machine to machine communications is disclosed. In one embodiment, the method includes storing policy information for machine to machine communications in a global DNS registry database server. The method further includes communicating the policy information for machine to machine communications from the global DNS registry database server to a machine DNS registry server located in an ISP network, wherein a control signaling gateway located in the ISP network is configured to utilize the policy information for machine to machine communications to allow only registered controllers associated with a machine to communicate with the machine.

Additional advantages and novel features will be set forth in part in the description that follows, and in part will become apparent to those skilled in the art upon examination of the following and the accompanying drawings. The advantages of the present teachings may be realized and attained by practice or use of various aspects of the methodologies, instrumentalities and combinations set forth in the detailed examples discussed below.

BRIEF DESCRIPTION OF THE DRAWINGS

For a more complete understanding of the present application, the objects and advantages thereof, reference is now made to the following descriptions taken in conjunction with the accompanying drawings, in which.

DETAILED DESCRIPTION OF THE INVENTION

The disclosed embodiments and advantages thereof are best understood by referring to FIGS. 1-4 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented.

Figure 1:
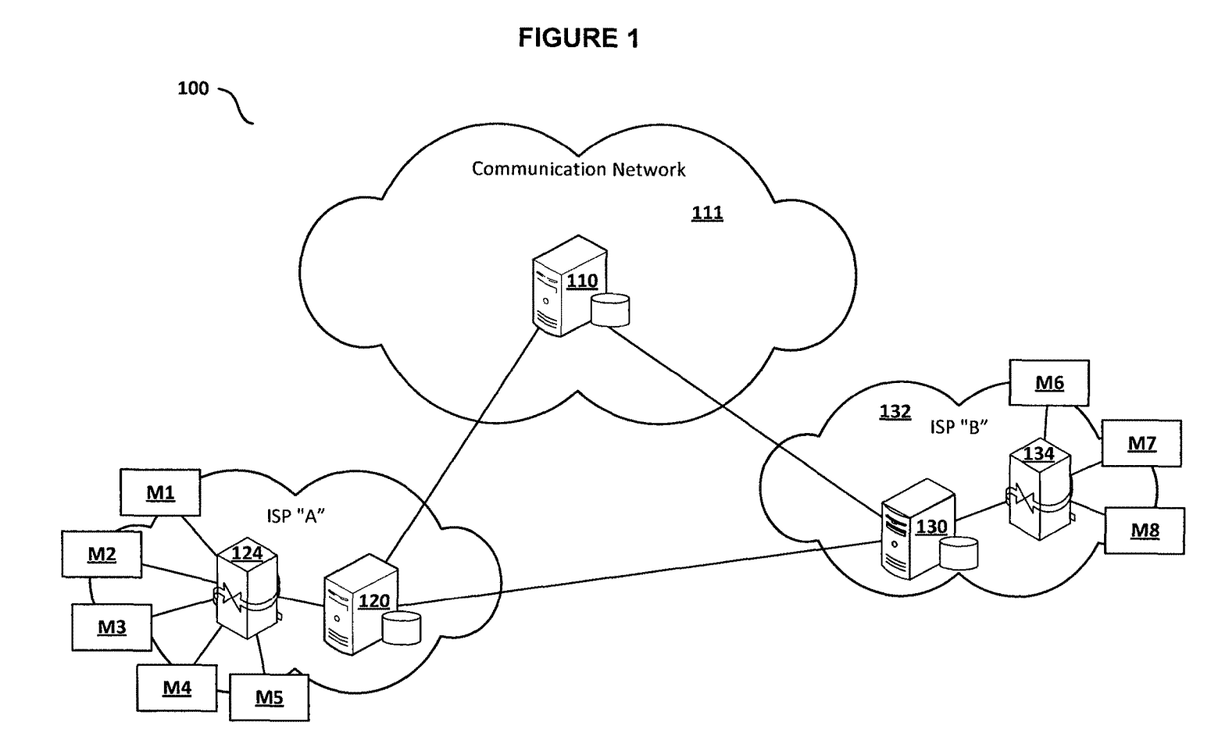
FIG. 1 depicts an embodiment of a network environment in which illustrative embodiments may be implemented.

FIG. 1 depicts a network environment 100 in accordance with the disclosed embodiments for providing a secure DNS and authorization structure for machine to machine communications. The network environment 100 includes a global machine registry 110 that resides on a secure private communication network 111, a secure machine registry/DNS 120 residing in a first Internet Service Provider (ISP) network 122 (indicated as ISP "A"), and a secure machine registry/DNS 130 residing in a second ISP network 132 (indicated as ISP "B").

The global machine registry 110 is maintained and controlled by a single third party authority. The global machine registry 110 is configured to communicate with the secure machine registry/DNS of each access provider over a secure connection. For example, the global machine registry 110 may communicate with the secure machine registry/DNS 120 over a secure virtual private network (VPN) that extends across public networks like the Internet. The global machine registry 110 acts as a central database that communicates updates to each access provider's secure machine registry/DNS. In certain embodiments, the global machine registry 110 uses an Access Control List (ACL) type list to determine whether a routing update or packet is permitted.

Within each ISP network is a local secure machine registry/DNS (e.g., secure machine registry/DNS 120 residing in ISP "A") that is configured to allow the global machine registry 110 database population rights. This means the global machine registry 110 can push updates to the secure machine registry/DNS 120. In certain embodiments, only the global machine registry 110 can push updates to the secure machine registry/DNS 120. Additionally, in some embodiments, depending on the trust relationship between ISPs, an ISP (e.g., ISP "A") can partner with another ISP (e.g., ISP "B") to allow each other to pull updates or other information from each other's secure machine registry/DNS. This enables machine to machine application owners to administrate the remote machine access administration automatically via the Secure DNS authentication structure.

In addition, located within each ISP network, are one or more control signaling gateways/firewall such as a control signaling gateway 124 in ISP network 122 and a control signaling gateway 134 in ISP network 132. The control signaling gateways control access to machines (e.g., M1-M8) located on the respective ISP network. For instance, in order for an external controller to securely talk to a machine that is located in ISP network 132 (e.g., M6), the external controller has to be part of an "assigned controller" policy of the control signaling gateway 134. This information is looked up or pulled from the local secure machine registry/DNS of the respective ISP network.

Figure 2:
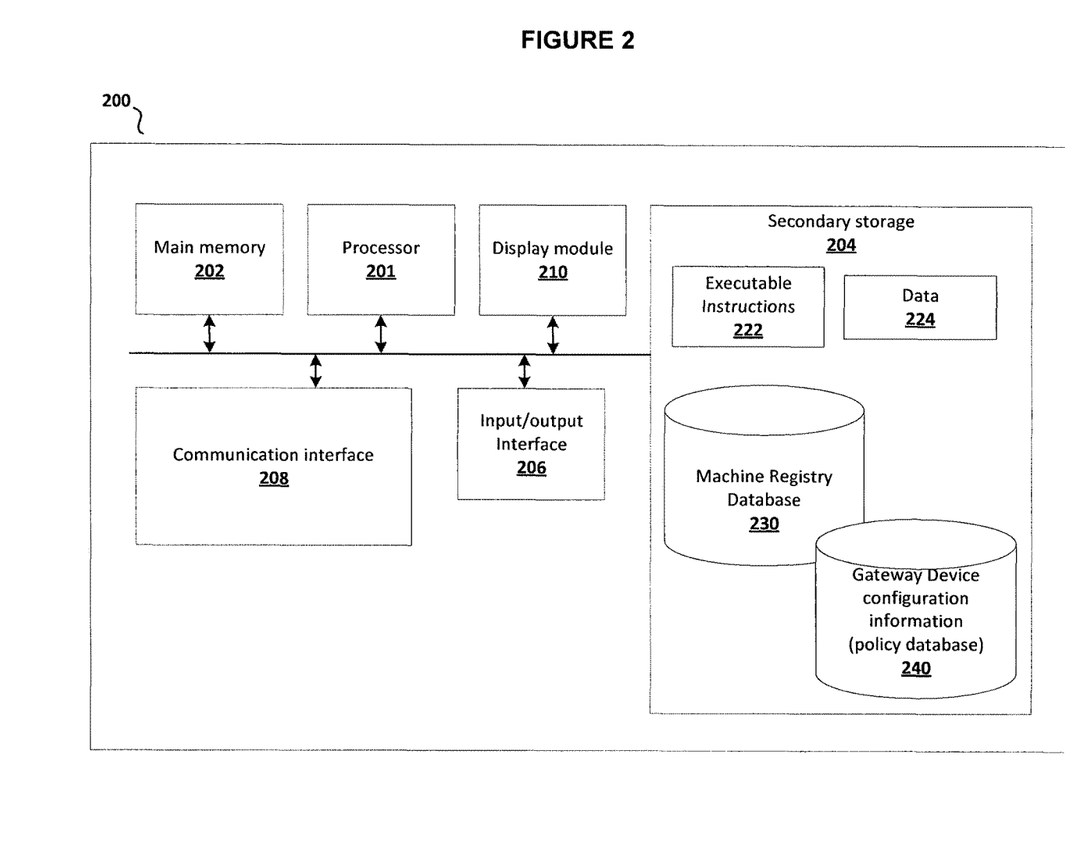
FIG. 2 is a block diagram illustrating the basic architecture of a system in accordance with a disclosed embodiment.

With reference now to FIG. 2, an example of the basic architecture of a system 200 is presented in accordance with the disclosed embodiments. The system 200 generally includes one or more processors 201 that are configured to execute instructions. The system 200 also includes main memory 202 for temporarily storing data and instructions to be processed, and a secondary storage component 204 for long term storage of executable instructions 222 and other data 224. In some embodiments, the system 200 may also include a display module 210 and an input/output interface 206 for connecting the system 200 to a display and/or other input/output devices. The system 200 also includes a communication interface 208 for coupling the system 200 to a communication network for enabling network communications.

To enable the architecture as illustrated in FIG. 1, the system 200 includes a modified DNS system having extended data fields. These new fields become policy configurations that allow the control signaling gateways (124, 134) to control access to the end elements (e.g., M1-M8) to ensure only authorized controllers can access the device. As stated above, in order for a controller to securely talk to a machine, the controller must be part of an "assigned controller" policy in the control signaling gateway.

In one embodiment, the system stores the policy configurations in a policy database 240. Examples of data fields included in the control signaling gateway policy configuration may include, but not limited to, 1) a list of machine domains; 2) an indicator of whether a machine domain is "active"; 3) a list of machines (individual devices) within a machine domain; 4) an indicator of whether a machine is active; 5) an list of organizational machine to machine owners that control access to the remote machine 6) state of each element (up/down) (inactive/active); 7) counters for bandwidth use; 8) logging information that is used for authentication and policy enforcement; and 9) attack indicators that logs unauthorized access activities.

The system 200 may also include a machine registry database 230 that stores parameters associated with a controller of a machine. For example, the machine registry database 230 may include a machine's north bound record such as, but not limited to, 1) a machine owner unique identifier (e.g., could be a DNS domain or another organization entity identifier); 2) a list of DNS addresses for the entity's controllers (e.g., the URL and IP addresses of the controllers); 3) a subclass of the DNS machine (e.g., security, health care, etc.) to ensure a hierarchy method of having multiple machine controllers per entity; 4) an owner name and/or point of contact (e.g., phone numbers, names, and addresses); 5) a fall back or secondary Secure DNS system to use if primary site is unreachable; and 6) email/text addresses if IP becomes unavailable.

The machine registry database 230 may also include information pertaining to the individual machines such as, but not limited to, 1) a device identifier (e.g., MAC address and or unique device names); 2) a device network address (e.g., IP address on Internet or Ethernet address on a local area network); 3) a gateway identifier (e.g., a DSL modem and/or wireless access point) supporting the device; 4) control signaling gateway IP address (i.e., the gateway for machine communication, e.g., control signaling gateway 124); 5) Filters (e.g., which communication protocols are allowed); 6) life line flag (i.e., keep live during power down—yes/no); 7) bandwidth allotment for communication; and 8) machine owner identifier.

In one embodiment, the executable instructions 222 of system 200 include an algorithm for populating the policy database 240 and the machine registry database 230 in a secure controlled fashion. The system 200 may include a secure application based DNS stack (one public DNS cache and a second secure DNS cache) that has security mechanisms to talk with the ISP secure DNS system (e.g., secure machine registry/DNS 120 associated with ISP "A" shown in FIG. 1) over a secure interface for transmitting machine registry updates to the ISPs' secure DNS systems. Additionally, in certain embodiments, a secondary DNS cache is created on the control signaling gateways and the end devices (i.e., customer equipment, central controllers, and/or their respective gateways) to ensure a secure non-volatile address resolution protocol is available.

Figure 3:
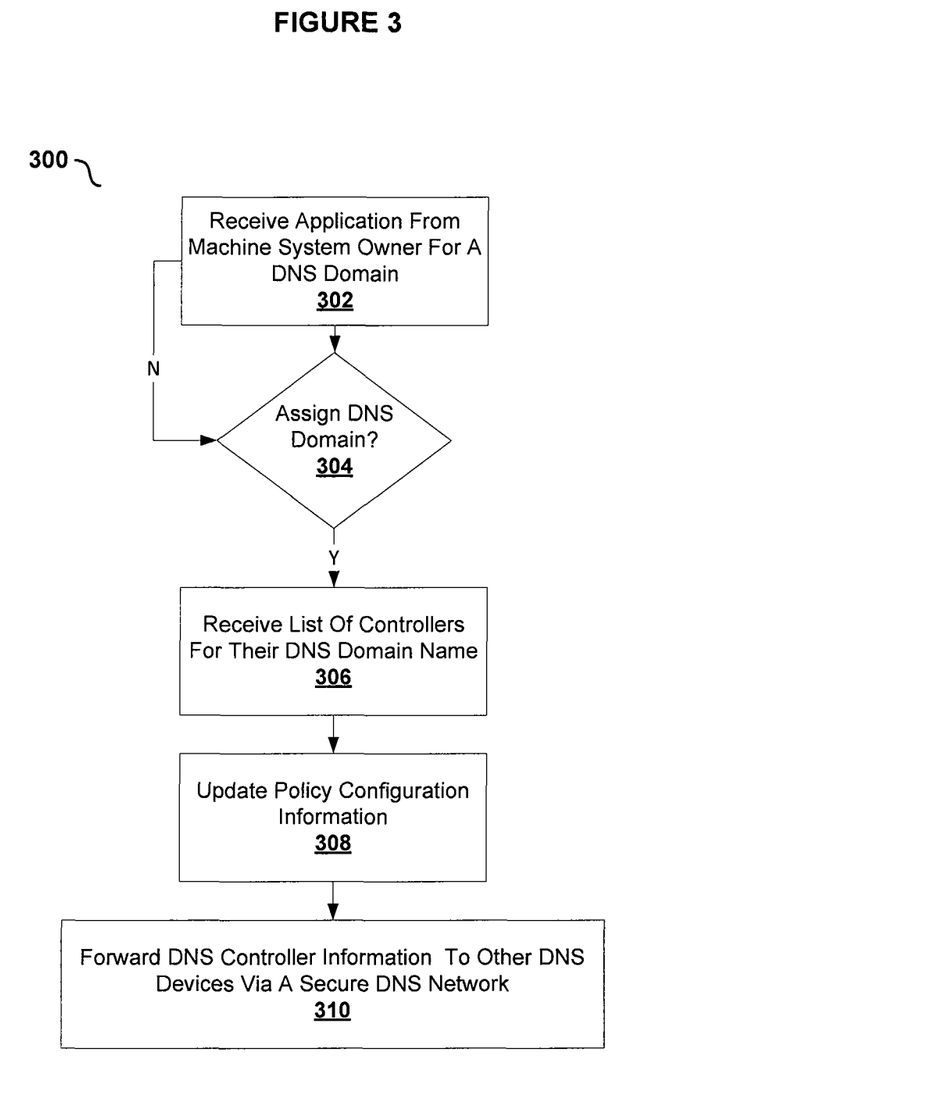
FIG. 3 depicts a flow chart illustrating a process for registering a machine in accordance with a disclosed embodiment.

Referring now to FIG. 3, a process 300 is illustrated for registering a machine in accordance with a disclosed embodiment. The process begins at step 302 by receiving an application from a machine system owner for a DNS domain. The process determines whether the requested DNS domain is available at step 304. If the domain name cannot be assigned to the machine system owner, the process will return a message to the machine system owner indicating that the requested DNS domain is unavailable. If the requested DNS domain is available, the process assigns the requested DNS domain to the machine system owner. The process then requests and receives a list of controllers associated with the assigned DNS domain at step 306. The process, at step 308, updates the policy configurations associated with the assigned DNS domain. The process forwards the DNS policy configuration information to the ISPs DNS systems over a secure DNS network at step 310, with process 300 terminating thereafter.

Figure 4:
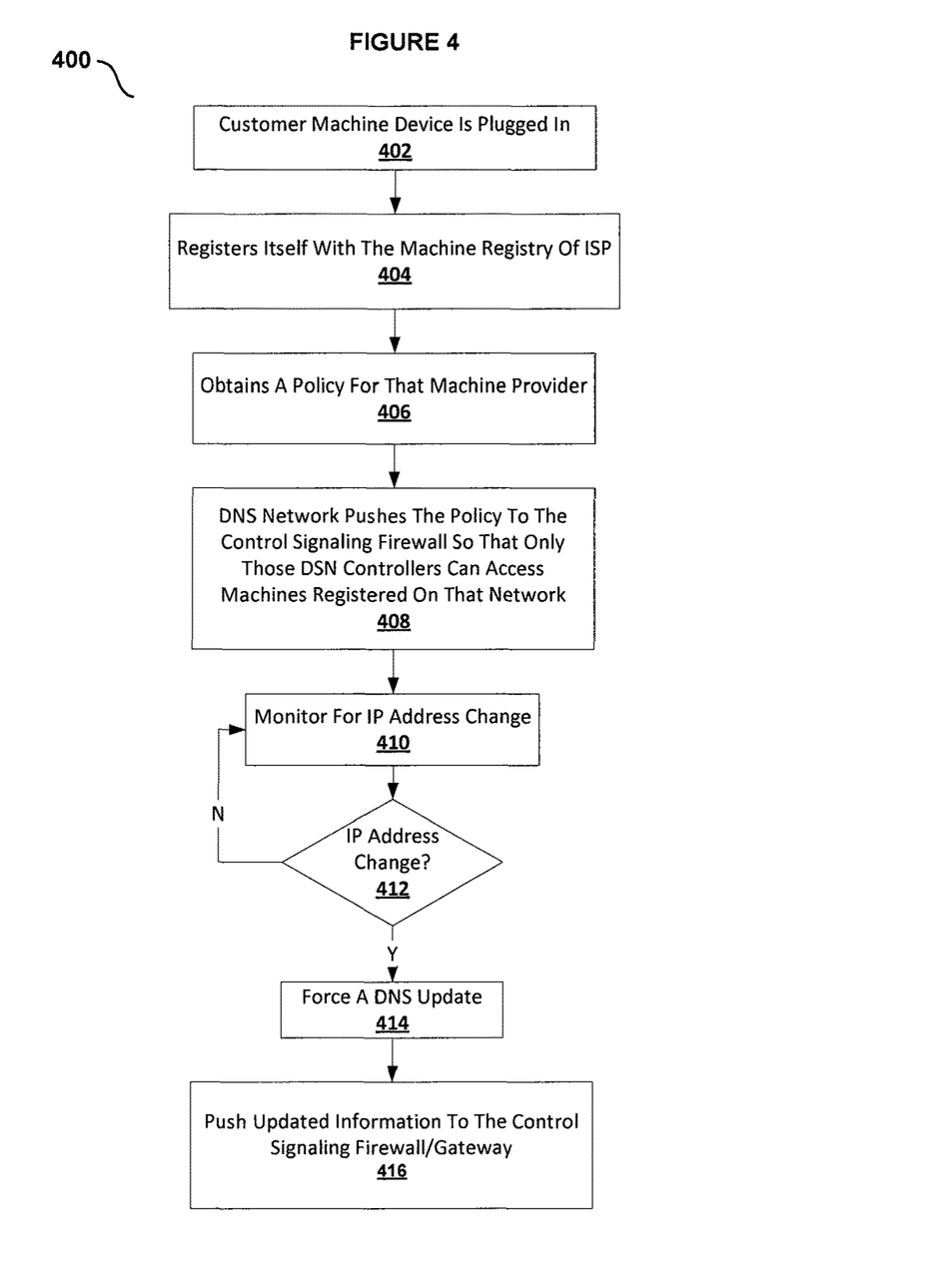
FIG. 4 depicts a flow chart illustrating a process for machine-to-machine communications in accordance with a disclosed embodiment.

FIG. 4 depicts a flow chart illustrating a process for machine-to-machine communications in accordance with a disclosed embodiment. At step 402, the process detects a network connection associated with a customer machine. The process, at step 404, receives registration information from the customer machine and registers the machine with the ISP's secure machine registry/DNS. The registration information includes a machine owner identifier associated with the machine provider. The process, at step 406, obtains a policy for the respective machine provider associated with the customer machine. At step 408, the process pushes the policy associated with the machine provider from the ISP secure machine registry/DNS to the control signaling firewall. The control signaling firewall utilizes the policy to ensure that only registered controllers associated with the customer machine are able to communicate with customer machine. For instance, if a device on the network requests communication with the customer machine, the control signaling firewall utilizes the policy information to determine whether the requesting device is a registered controller to determine whether the requesting device is able to communicate with the customer machine. In certain embodiments, if a requesting device is not a registered controller, the control signaling firewall not only blocks the communication request, but will also prevent the disclosure of the customer machine's IP address to the requesting device.

In addition, in certain embodiments, the process, at step 410, monitors for any IP address changes associated with either a controller or a machine. If the process identifies an IP address change for either a controller or a machine, the process at step 414 forces a DNS update on the ISP secure machine registry/DNS and on the global machine registry. At step 416, the process pushes the updated information to the control signaling firewall/gateway for enabling the control signaling firewall to enforce the updated policy.

Accordingly, the above disclosure enables a controlled and contained secure DNS network for machine to machine communications. Although not illustrated in the flowchart, the disclosed embodiments may include secure intelligent routing for machine to machine communications. For instance, a power company's controller device may identify a power issue with a customer machine, and automatically notify a machine of a third party to schedule a repair. The third party machine identifier may be added as an extra data field in the controller or customer machine's policy configuration information. Additionally, in certain embodiments, the policy configuration information may include a reroute data field for rerouting communications of a customer machine to another controller or device in the event that communications to a controller is down.

As will be appreciated by one skilled in the art, the disclosed embodiments may be embodied as a system, apparatus, method, or as a computer program product. Accordingly, the disclosed embodiments may be implemented entirely with hardware, or as software (including firmware, resident software, micro-code, etc.) that is embodied in a tangible medium, or as a combination of hardware and software.

Furthermore, the computer program product may be embodied in any tangible medium of expression having computer-usable program code embodied in the medium. Computer program code for carrying out operations of the present invention may be written in any combination of one or more programming or machine languages. The program code may execute entirely or partially on one or more local or remote devices. In the latter scenario, the remote devices may be connected through any type of network, including a local area network (LAN) or a wide area network (WAN), or the connection may be made to an external computer (for example, via the Internet).

The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

In addition, the flowchart and block diagrams in the figures illustrate the architecture, functionality, and operation of possible implementations of systems, methods and computer program products according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated. The scope of the claims is intended to broadly cover the disclosed embodiments and any such modification.

What is claimed is:

1. A machine to machine (M2M) secure domain name system (DNS) comprising:
 a machine DNS registry server hardware-implemented on a computer comprising a processor and located in an Internet service provider (ISP) network, wherein the machine DNS registry server receives a plurality of policies for M2M communications from a global DNS registry database server over a secure connection between the global DNS registry database server and the machine DNS registry server located in the ISP network, wherein the plurality of policies comprises a first policy, the first policy comprising a machine domain and a list of machines associated with the machine domain, and wherein the first policy further includes at least one of an indicator of whether a machine domain is active, an indicator of whether each machine is active, a list of organizational M2M owners that control access to a remote machine, an indicator of whether each end element is active, or an attack indicator indicating unauthorized access activities;
 a control signaling gateway hardware-implemented on a computer comprising a processor and located in the ISP network and in communication with the machine DNS registry server located in the ISP network, the control signaling gateway configured to utilize the plurality of policies for M2M communications to allow only registered controllers associated with a machine to communicate with the machine.

2. The system of claim 1, wherein the global DNS registry database server is configured to push the plurality of policies for M2M communications to all machine DNS registry servers associated with subscribing ISP networks.

3. The system of claim 1, wherein the global DNS registry database server is maintained and controlled by a single third party authority separate from the ISP.

4. The system of claim 1, wherein the machine DNS registry server located in the ISP network is configured to enable only the global DNS registry database server to push updates to the machine DNS registry server.

5. The system of claim 1, wherein the machine DNS registry server stores controller parameters associated with the registered controllers, wherein the controller parameters include a machine owner unique identifier, a list of DNS addresses for controllers associated with the machine owner unique identifier, and a subclass associated with the machine DNS registry server located in the ISP network.

6. The system of claim 1, wherein the machine DNS registry server stores machine parameters associated with individual machines, wherein the machine parameters include a device identifier, a device network address, a control signaling gateway IP address associated with the device, communication protocol filters, and bandwidth allotment for communication.

7. The system of claim 1, wherein the first policy further comprises, for one or more of the machines, a bandwidth allocation for that machine.

8. The system of claim 1, wherein the control signaling gateway is further configured to:
receive a communication request directed from a requesting device to one of the machines listed in the first policy;
determine, from the first policy, whether the communication request originated from a registered controller associated with the one of the machines; and
based on a determination that the communication request did not originate from a registered controller, block the communication request.

9. The system of claim 8, wherein the control signaling gateway is further configured to prevent the disclosure of an IP address of the machine to the requesting device.

10. A method for providing a secure domain name system (DNS) for machine to machine (M2M) communications, the method comprising:
receiving, at a machine DNS registry server in an Internet Service Provider (ISP) network, a plurality of policies for M2M communications from a global DNS registry database server over a secure connection between the global DNS registry database server and the machine DNS registry server located in the ISP network, wherein the plurality of policies comprises a first policy, the first policy comprising a machine domain and a list of machines associated with the machine domain, wherein the first policy further includes at least one of an indicator of whether a machine domain is active, an indicator of whether each machine is active, a list of organizational M2M owners that control access to a remote machine, an indicator of whether each end element is active, or an attack indicator indicating unauthorized access activities;
configuring a control signaling gateway located in the ISP network, with the plurality of policies for M2M communications, to allow only registered controllers associated with a machine to communicate with the machine.

11. The method of claim 10, wherein the global DNS registry database server is configured to push the plurality of policies for M2M communications to all machine DNS registry servers associated with subscribing ISP networks.

12. The method of claim 10, wherein the global DNS registry database server is maintained and controlled by a single third party authority separate from the ISP.

13. The method of claim 10, wherein the machine DNS registry server located in the ISP network is configured to enable only the global DNS registry database server to push updates to the machine DNS registry server.

14. The method of claim 10, further comprising:
storing, by the machine DNS registry server, controller parameters associated with the registered controllers, wherein the controller parameters include a machine owner unique identifier, a list of DNS addresses for controllers associated with the machine owner unique identifier, and a subclass associated with the machine DNS registry server located in the ISP network.

15. The method of claim 10, further comprising:
storing, by the machine DNS registry server, machine parameters associated with individual machines, wherein the machine parameters include a device identifier, a device network address, a control signaling gateway IP address associated with the device, communication protocol filters, and bandwidth allotment for communication.

16. The method of claim 10, wherein the first policy further comprises, for one or more of the machines, a bandwidth allocation for that machine.

17. The method of claim 10, further comprising:
receiving, by the control signaling gateway, a communication request directed from a requesting device to one of the machines listed in the first policy;
determining, by the control signaling gateway, from the first policy, whether the communication request originated from a registered controller associated with the one of the machines; and
based on a determination that the communication request did not originate from a registered controller, blocking, by the control signaling gateway, the communication request.

18. The method of claim 17, further comprising:
preventing, by the control signaling gateway, the disclosure of an IP address of the machine to the requesting device.

* * * * *